United States Patent
Woollenweber et al.

[11] Patent Number: 5,870,894
[45] Date of Patent: Feb. 16, 1999

[54] MOTOR-ASSISTED SUPERCHARGING DEVICES FOR INTERNAL COMBUSTION ENGINES

[75] Inventors: William E. Woollenweber, Carlsbad; Edward M. Halimi, Montecito, both of Calif.

[73] Assignee: Turbodyne Systems, Inc., Carpinteria, Calif.

[21] Appl. No.: 680,671

[22] Filed: Jul. 16, 1996

[51] Int. Cl.⁶ ............................................. F02B 37/10
[52] U.S. Cl. ........................ 60/607; 417/423.7; 417/407
[58] Field of Search .................. 60/607, 608; 417/423.7

[56] References Cited

U.S. PATENT DOCUMENTS

| | | | |
|---|---|---|---|
| 2,649,048 | 8/1953 | Pezzillo et al. | 417/423.7 |
| 2,782,721 | 2/1957 | White | 417/423.7 |
| 3,572,982 | 3/1971 | Kozdon | 417/423.7 |
| 4,253,031 | 2/1981 | Frister | 417/407 |
| 4,827,170 | 5/1989 | Kawamura et al. | 60/608 |
| 4,850,193 | 7/1989 | Kawamura | 60/608 |
| 4,878,347 | 11/1989 | Kawamura | 60/608 |
| 4,882,905 | 11/1989 | Kawamura | 60/608 |
| 4,894,991 | 1/1990 | Kawamura | 60/608 |
| 4,901,530 | 2/1990 | Kawamura | 60/608 |
| 4,935,656 | 6/1990 | Kawamura | 60/608 |
| 4,958,497 | 9/1990 | Kawamura | 60/608 |
| 4,958,708 | 9/1990 | Kawamura | 192/0.098 |
| 5,038,566 | 8/1991 | Hara | 60/608 |
| 5,176,509 | 1/1993 | Schmider et al. | 417/423.7 |
| 5,406,797 | 4/1995 | Kawamura | 60/608 |
| 5,605,045 | 2/1997 | Halimi et al. | 60/607 |

*Primary Examiner*—Michael Koczo
*Attorney, Agent, or Firm*—Brinks Hofer Gilson & Lione

[57] ABSTRACT

An improved machine includes a combination of elements of a rotary electric machine and an air compressor, such as in a turbocharger, and provides an improved turbocharging device for enhancing turbocharged internal combustion engine performance. The improved turbocharger includes a plurality of magnets which are mounted in a generally circumferential arrangement about the back face of the compressor wheel. A stator winding is mounted in opposing relation to the motor magnets. Torque can be applied to the magnets and hence to the compressor wheel when the stator is energized by an appropriate energizing circuit, thereby improving engine performance especially at low engine speeds.

13 Claims, 6 Drawing Sheets

MOTOR-ASSISTED SUPERCHARGING DEVICES FOR INTERNAL COMBUSTION ENGINES

FIELD OF THE INVENTION

This invention relates generally to supercharging apparatus for use with internal combustion engines, and more particularly to a compressor apparatus having an integral electric motor and a method for combining the elements of a turbocharger and electric motor/generator in a turbocharger assembly.

BACKGROUND OF THE INVENTION

Turbochargers are well known and widely used with internal combustion engines. Generally, turbochargers supply more charge air for the combustion process than can otherwise be induced through natural aspiration. This increased air supply allows more fuel to be burned, thereby increasing power and torque obtainable from an engine having a given displacement. Additional benefits include the possibility of using lower-displacement, lighter engines with corresponding lower total vehicle weight to reduce fuel consumption, and use of available production engines to achieve improved performance characteristics. Some turbocharger applications include the incorporation of an intercooler for removing heat (both an ambient heat component and heat generated during charge air compression) from the charge air before it enters the engine, thereby providing an even more dense air charge to be delivered to the engine cylinders. Intercooled turbocharging applied to diesel engines has been known to at least double the power output of a given engine size, in comparison with naturally aspirated diesel engines of the same engine displacement.

Additional advantages of turbocharging include improvements in thermal efficiency through the use of some energy of the exhaust gas stream that would otherwise be lost to the environment, and the maintenance of sea level power ratings up to high altitudes.

At medium to high engine speeds, there is an abundance of energy in the engine exhaust gas stream and, over this operating speed range, the turbocharger is capable of supplying the engine cylinders with all the air needed for efficient combustion and maximum power and torque output for a given engine construction. In certain applications, however, an exhaust stream waste gate is needed to bleed off excess energy in the engine exhaust stream before it enters the turbocharger turbine to prevent the engine from being overcharged. Typically, the waste gate is set to open at a pressure below which undesirable predetonation or an unacceptably high internal engine cylinder pressure may be generated.

At low engine speeds, such as idle speed, however, there is disproportionately little energy in the exhaust stream as may be found at higher engine speeds, and this energy deficiency prevents the turbocharger from providing a significant level of boost in the engine intake air system. As a result, when the throttle is opened for the purpose of accelerating the engine from low speeds, such as idle speed, there is a measurable time lag and corresponding performance delay, before the exhaust gas energy level rises sufficiently to accelerate the turbocharger rotor and provide the compression of intake air needed for improved engine performance. The performance effect of this time lag may be pronounced in smaller output engines which have a relatively small amount of power and torque available before the turbocharger comes up to speed and provides the desired compression. Various efforts have been made to address this issue of time lag, including reductions of inertia of turbocharger rotors.

In spite of evolutionary design changes for minimizing the inertia of the turbocharger rotor, however, the time lag period is still present to a significant degree, especially in turbochargers for use with highly rated engines intended for powering a variety of on-highway and off-highway equipment.

Furthermore, to reduce exhaust smoke and emissions during acceleration periods when an optimal fuel burn is more difficult to achieve and maintain as compared with steady-speed operation, commercial engines employ devices in the fuel system to limit the fuel delivered to the engine cylinders until a sufficiently high boost level can be provided by the turbocharger. These devices reduce excessive smoking, but the limited fuel delivery rate causes a sluggishness in the response of the engine to speed and load changes.

The turbo-lag period can be mitigated and, in many instances, virtually eliminated by using an external power source to assist the turbocharger in responding to engine speed and load increases. One such method is to use an external electrical energy supply, such as energy stored in d.c. batteries to power an electric motor attached to the turbocharger rotating assembly. The electric motor can be external and attached to the turbocharger rotor through a clutching mechanism, or it can be added onto the turbocharger rotating assembly and energized and de-energized through the use of appropriate electronic controls.

Turbocharging systems with integral assisting motors are more completely described in our pending U.S. patent application Ser. No. 08/529,672.

Other patents disclosing turbocharger-electrical machine combinations include U.S. Pat. Nos. 5,406,797; 5,038,566; 4,958,708; 4,958,497; 4,901,530; 4,894,991; 4,882,905; 4,878,317 and 4,850,193. More particularly, U.S. Patent No. 5,406,797 discloses turbocharger with a rotary electric machine which is added to the rotatable shaft of a turbocharger. Power for operation of the rotary electric machine is provided by an a.c. electric generator held in engagement with the flywheel of the engine. An inverter converts the a.c. electric power produced by the electric generator to an a.c. output having a predetermined frequency, the inverter including a rectifier for rectify the generated a.c. electric power to d.c. electric power, and yet another power device is required for converting the d.c. electric power to a.c. electric power having the predetermined frequency to energize the rotary electric machine.

U.S. Pat. No. 4,958,708 discloses another rotary electric machine which is added to the turbocharger shaft to which the intake air compressor and exhaust turbine are affixed. The rotary electric machine of this patent comprises a rotor composed of permanent magnets and a stator with polyphase windings driven from an invertor/controller.

The attachment of the permanent magnets to the turbocharger shaft has a major disadvantage in that the magnets are subjected to heat which is conducted along the shaft from the hot turbine wheel of the turbocharger. This can present a significant problem in that the permeability of the magnets may be reduced by such heating to a level which may be unacceptable for efficient operation of the rotary electric machine. This becomes a serious problem when the turbocharged engine is subjected to a hot shutdown and the oil flow through the bearings and over the shaft is interrupted. A steep temperature gradient will exist for a significant length of time while the hot parts of the turbocharger are drained of their heat content.

Notwithstanding the efforts to develop motor-assisted turbocharger systems, there is still a need for an improved turbocharger which improves the performance and low-speed response characteristics of the conventional internal combustion engine and for an improved motor-assisted supercharging apparatus, such as motor-driven compressor.

SUMMARY OF THE INVENTION

The present invention thus overcomes those problems of the prior art by positioning the motor magnets in the coolest part of the turbocharger assembly. One particularly advantageous location is on the hub of the aluminum compressor wheel. During operation of the turbocharger, ambient air enters the compressor wheel intake and is not heated appreciably by the compression process until the air reaches the outer portion of the wheel. Furthermore, since approximately half of the temperature rise occurs in the compressor wheel and the remaining temperature rise occurs in the stationary diffuser passage outboard of the compressor wheel, placing the magnets on the rear face of the compressor wheel near its center is a location where they will remain at minimal temperatures during operation. In the event of a hot shutdown, the compressor wheel vanes act to radiate heat out of the hub area and the temperature in the hub will be near the low end of the gradient between the hot turbine parts and ambient conditions.

Therefore, the present invention maintains the magnets at acceptable operating temperatures in a preferred embodiment, by locating the magnets of the rotary electric machine outboard of the interior of the turbocharger center housing, mounted on the hub section of the compressor wheel. As a further means of keeping the magnets at an acceptable temperature level, an insulating material can be placed between the magnets and the aluminum metal surface of the compressor wheel. In this manner, conduction of heat into the magnets from the wheel can be minimized.

Accordingly, the improved turbocharger of the present invention combines the elements of a rotary electric machine and a turbocharger in an optimal integrated design that can maximize the torque applied to the turbocharger rotor and that minimizes any compromise in the turbocharger basic design configuration. More particularly, a plurality of motor magnets are mounted in a generally circumferential arrangement about the back face of the compressor wheel at a constant radial offset from the shaft on which both the compressor wheel and exhaust turbine are mounted. The motor magnets are mounted to a circumferential shoulder formed at an intermediate radial distance along the back face of the compression wheel, and are retained in place against centrifugal and axial forces by a circumferentially extending steel retention sleeve. A stator or motor winding is axially mounted in the turbocharger housing and extends, according to one embodiment, radially outwardly of the magnets secured to the compressor wheel. According to another embodiment, the stator is positioned in an opposing, axially offset relationship to the motor magnets.

According to the operation of the invention, when the stator is energized by the power source, a rotating electromagnetic force field is generated adjacent the motor magnets, and the resulting magnetic interaction applies a torque to the compressor wheel which augments the torque being applied to the connecting shaft by an exhaust gas stream flowing through the exhaust turbine, causing the rotating assembly of the turbocharger to turn faster than if it were not equipped with the invention. The faster rotation of the compressor wheel can allow it to supply the engine with a greater flow of compressed combustion air at higher pressure at any engine speed, thereby improving engine performance while reducing the amount of smoke and pollutants emitted during acceleration of the engine.

According to yet another embodiment of the invention, the combination of compressor and motor elements employed for either of the first two described embodiments may be used in a separate device to provide a flow of compressed air, with each of the plurality of compressor magnets being circumferentially arrayed about the back face of the compressor wheel which rotates about a shorter axial shaft in the absence of an exhaust turbine, thereby providing compressed air from an assembly with extremely compact dimensions to be used as a motor-driven engine supercharging device.

Further features and advantages of the invention will be apparent from the drawings and more detailed description that follows.

DETAILED DESCRIPTION OF THE PREFERRED EMBODIMENTS

Figure 1:
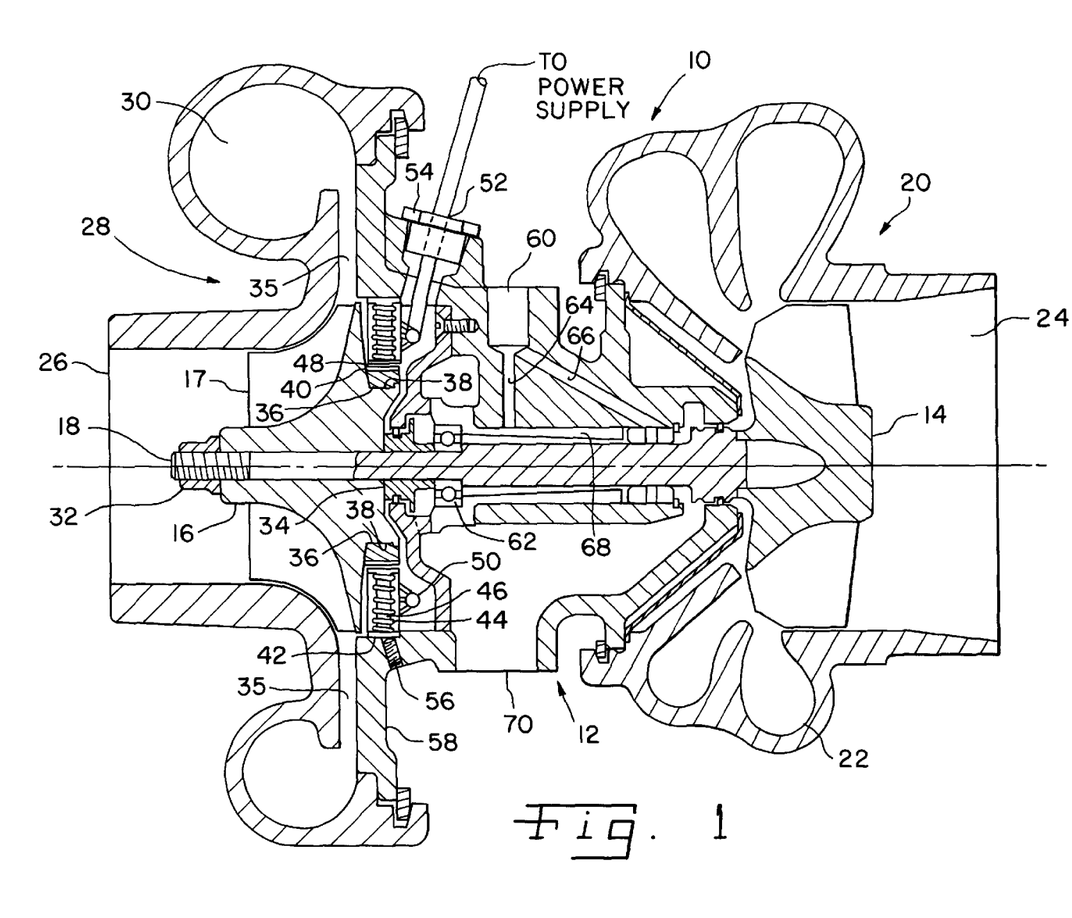
FIG. 1 is a cross-sectional view of one embodiment of the turbocharger apparatus of the present invention taken at a plane through the longitudinal axis of the main shaft of the turbocharger.

Referring now to the drawings, and particularly to FIG. 1, a turbocharger 10 combines the elements of a rotary electric machine and a turbocharger in accordance with the invention. The turbocharger 10 is, except for the inclusion of electric machine elements, of substantially conventional design, structure and size. The turbocharger 10 includes a housing 12 for supporting a multi-vaned exhaust gas turbine wheel 14 and an air charging compressor wheel 16 having a plurality of vanes 17 mounted on the opposite ends of a common connecting shaft 18. The turbine includes a turbine housing 20 which has an exhaust stream inlet scroll 22 that is connected to receive exhaust gas from an internal combustion engine which in some applications has an exhaust manifold divided into two sections, each section receiving exhaust gas from a different set of engine cylinders (not shown). The exhaust gas is directed and drives the turbine wheel and shaft 18 in rotation. After passing through the turbine wheel 14, the exhaust gas stream flows out of the turbocharger through an exhaust vent 24.

Rotation of shaft 18 rotates the attached compressor wheel 16 at the opposite end of the connecting shaft 18, and combustion air is drawn in through an air intake opening 26 formed in a compressor casing 28 after passing through an appropriate filter (not shown) to remove contaminants. The compressor casing 28 includes a scroll 30 for directing the compressed combustion air to an engine intake manifold (not shown). The compressor wheel 16 is secured on the rotating shaft 18 between a lock nut 32 and a sleeve 34. The inflowing combustion air is compressed by the driven compression wheel vanes 17, which are formed on a front face of the compressor wheel 16. After being compressed by the compressor wheel 16 and passing through a diffuser section 35, the compressed combustion air is directed through the inlet scroll 30 and is delivered to the intake manifold system (not shown) of the engine.

According to the invention, a plurality of magnets 36 are mounted in a generally circumferential arrangement about the back face of the compressor wheel 16 at a constant radial offset from the connecting shaft 18, although it is contemplated that such arrangement may be staggered or otherwise repositioned in machines of the invention for better balancing, inertia, generated torque and the like. According to one embodiment of the present invention, the magnets 36 are mounted to a circumferential shoulder or ledge 38 formed in the back face of the compression wheel 18, and are retained in place against centrifugal and axial forces by a circumferentially extending steel retention sleeve 40.

A stator winding 42 consisting of an electrical conductor such as copper wire 44 wound around a laminated steel core 46 is located in the center housing 12 of the turbocharger 10, and extends radially outwardly of the magnets 36 secured to the compressor wheel 16. An air gap generally indicated at 48 is provided between the steel retention sleeve 40 and the inner diameter of the motor winding 42 to provide necessary running clearance and prevent any physical contact therebetween.

The wires 44 of the winding 42 extend to connecting wires 50 which terminate at location 52 (shown out of plane), where they exit from the center housing through a sealed fitting 54, and are thence led to an appropriate electronic control and power supply. The sealed fitting 54 encapsulates the connecting wires 50 to prevent ingress of moisture and contaminants. The winding 42 is retained in an orientation coaxial with the connecting shaft 18 by one or more set screws 56 which extends through an outwardly extending segment 58 of the center housing 12 and engages with the outer circumference of the winding 42.

According to the operation of the invention, when the stator, i.e. winding 42, is energized by an appropriate power source, torque is applied to the compressor wheel 16 by the magnets 36 and augments the torque being applied to the connecting shaft 18 by the exhaust turbine 14, causing the rotating assembly of the turbocharger to turn faster than if it were not equipped with the invention. The faster rotation of the compressor wheel 16 allows it to supply the engine with a greater flow of air at higher pressure at any engine speed, thereby improving engine performance while reducing the amount of smoke and pollutants emitted during acceleration of the engine.

It will be apparent to the skilled artisan that the additional components of the turbocharger not discussed in detail are well known in the art, including shaft bearings and oil sealing elements necessary for reliable support of the rotating assembly and for containment and filtration of the lubricating oil that is conventionally supplied from a pressurized oil system to lubricate and cool the bearings. The oil stream enters the center housing at 60 and, after passing through the bearing system, including for example roller bearing 62 and oil conduits 64, 66, 68, flows to collector 70 and is then conveyed back to the engine oil sump (not shown).

Figure 2:
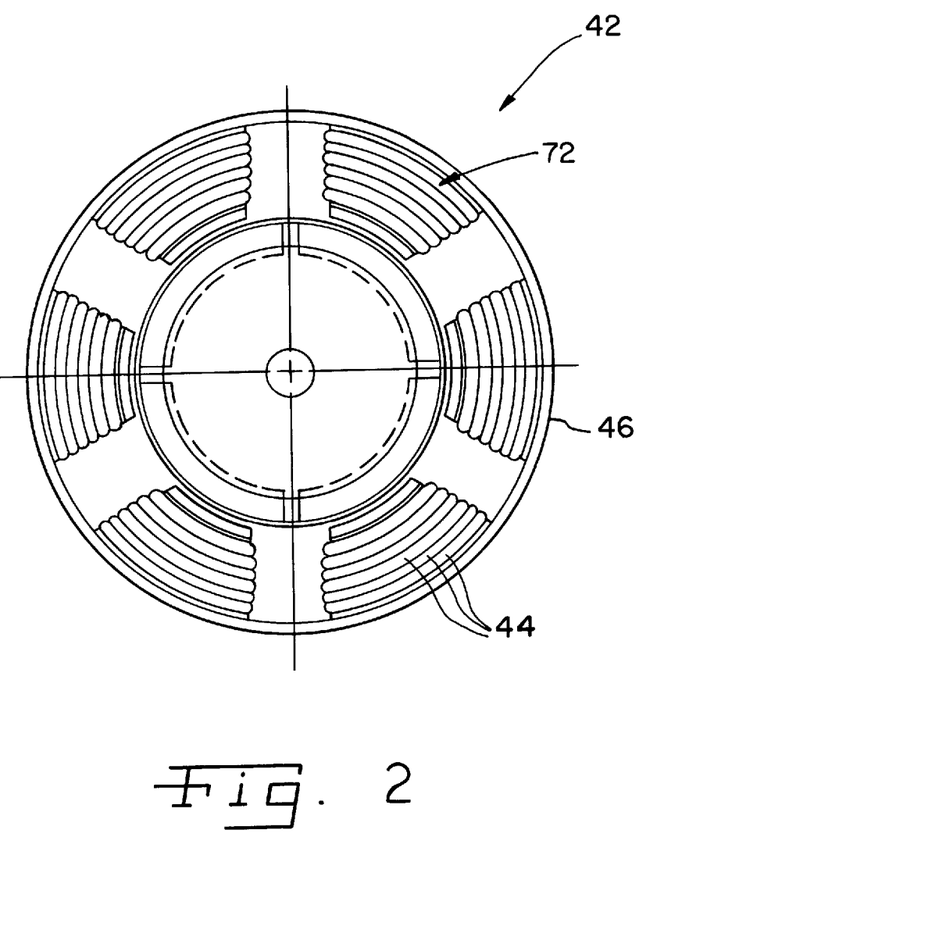
FIG. 2 is an elevational view of a stator configured to be received radially outwardly of the compressor wheel magnets in the turbocharger shown in FIG. 1.

With reference now to FIG. 2, the stator 42 includes a plurality of laminations of suitable, magnetically permeable material. The laminations of the stator 42 are formed to define six poles, each carrying winding 72 of copper wire 44 which is electrically connected outside of the laminations and which can be progressively energized to create a rotating magnetic field around the outside of the magnets 36. The resulting rotating magnetic field couples with the magnetic field of the magnets 36 attached to the compressor wheel 16 to assist rotation of the turbocharger especially at low engine speeds.

Figure 3:
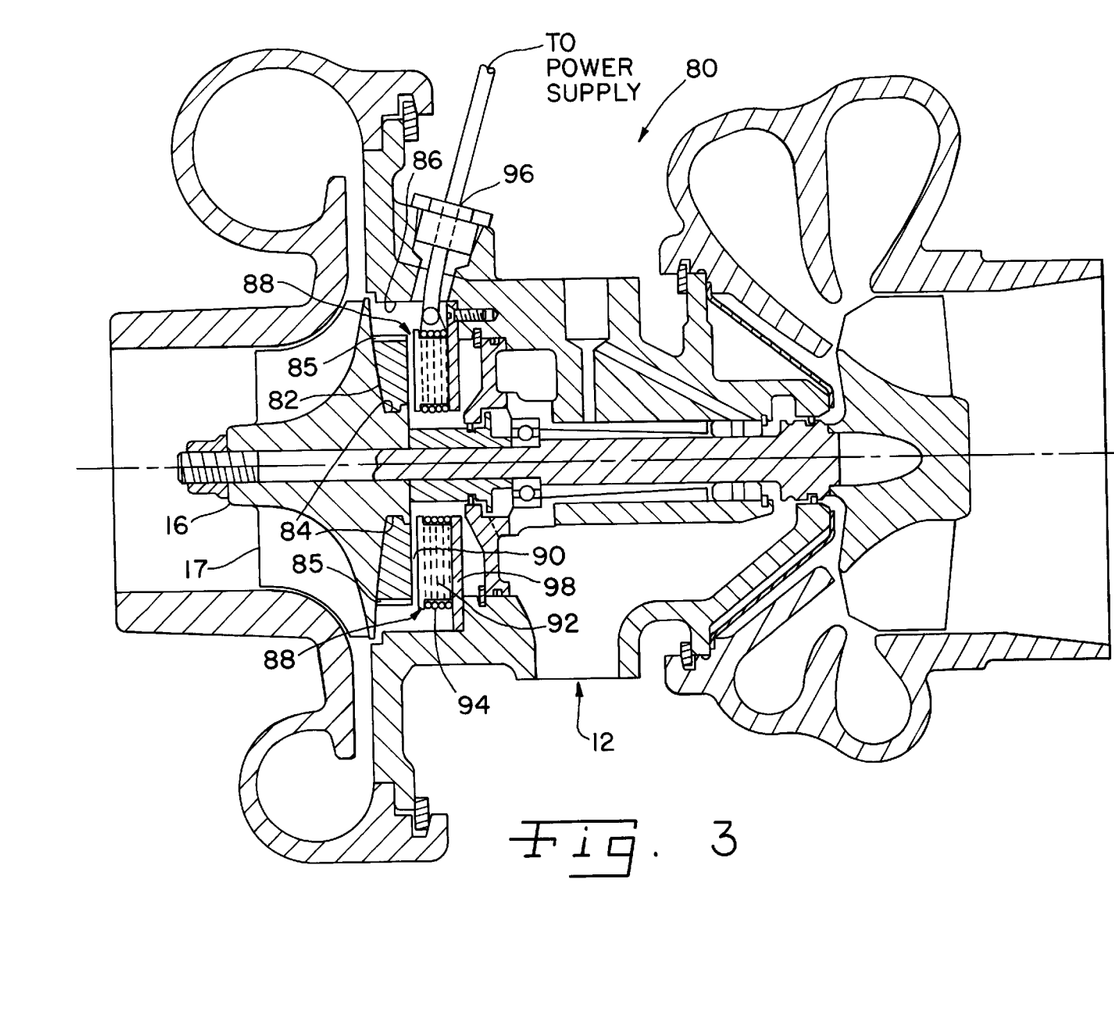
FIG. 3 is a cross-sectional view of another embodiment of the turbocharger apparatus taken at a plane through the longitudinal axis of the main shaft of the turbocharger, showing the stator mounted in an axially offset orientation relative to the compressor wheel magnets.

With reference to FIG. 3, a second embodiment 80 of the turbocharger of the present invention includes a plurality of magnets 82 which have a larger dimension in the radial direction extending from a shoulder 84 formed at a radially intermediate location on the back face of the compressor wheel 16. More particularly, the magnets 82 of the second embodiment extend a greater radial height into an annular space defined between the shoulder 84 and an inner surface 86 of housing portion 58. A stator 88 is supported in the turbocharger housing 12 in opposing, axially offset relationship to the motor magnets 82. A retention sleeve 85 secures the magnets 82 to the compressor wheel 16 against centrifugal and axial forces in the manner previously described. The remaining components of the turbocharger shown in FIG. 3 are the same as those shown in FIG. 1 and perform the same functions as previously described.

Mounting of the magnets with the windings axially offset from the motor magnets 36 as shown in FIG. 3 allows for the use of larger magnets having an increased dimension in the radial direction along the back face of the compressor wheel. Larger magnet sizes corresponds with larger torques which can thus be exerted on the compressor wheel 16 as compared with the embodiment shown in FIG. 1. However, the embodiment shown in FIG. 3, which utilizes an axially-offset stator, contributes additional axial space in the interior of the turbocharger housing 12 and lengthens the overhang of the compressor wheel 12 from the compressor and bearings.

Figure 4:
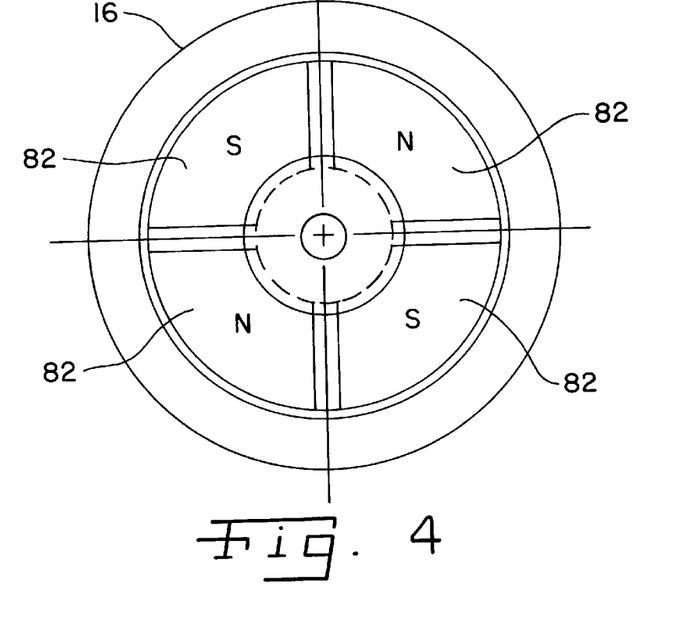
FIG. 4 is an elevational view of the compressor wheel of FIG. 3 showing the motor magnets secured to the compressor wheel.

Again referring to FIG. 3, the stator 88 is positioned adjacent to the magnets 82 with a small air gap 90 therebetween. The windings of the stator 88 include six laminated cores 92 around which copper wire 94 is wound in one or more layers. The connections to each wire 94 are led to a single location and exit the center housing 12 through a sealed fitting 96, and are available for connection to an appropriate electronic control and power supply. The magnets 82 attached to the back face of the compressor wheel 16 may be arranged, for example, according to the embodiment having four magnets as shown in FIG. 4; however, a greater or lessor number of motor magnets 82 and a greater or lesser number of stator poles may be used with this turbocharging system. According to the embodiment shown in FIG. 4, the four magnets 82 are arranged in alternating north-south polarity around the center of the stator and are electrically isolated from one another.

Figure 5:
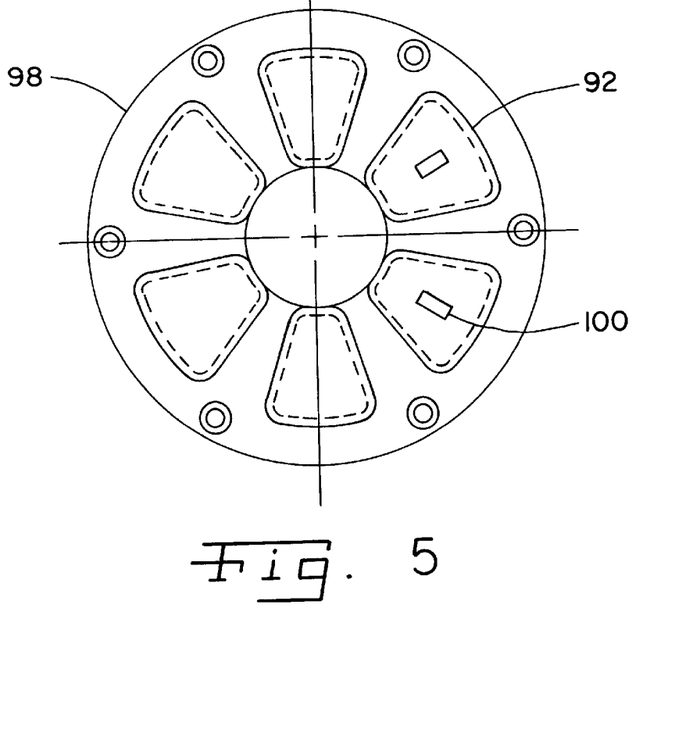
FIG. 5 is an elevational view of the motor windings secured to a face plate to be attached to the turbocharger housing adjacent to the motor magnets.

FIG. 5 shows a front view of the iron cores 92 provided on a face plate 98, which is attached to the center housing 12 of the turbocharger. One or more Hall effect sensors 100 affixed to the assembly and preferably at a centered location on one or more iron cores 92 are used to detect the position of the magnets 82 on the rotating member and to send a signal to the electronic control (not shown), for indicating when each one of the separate winding fields is to be energized.

Figure 6:
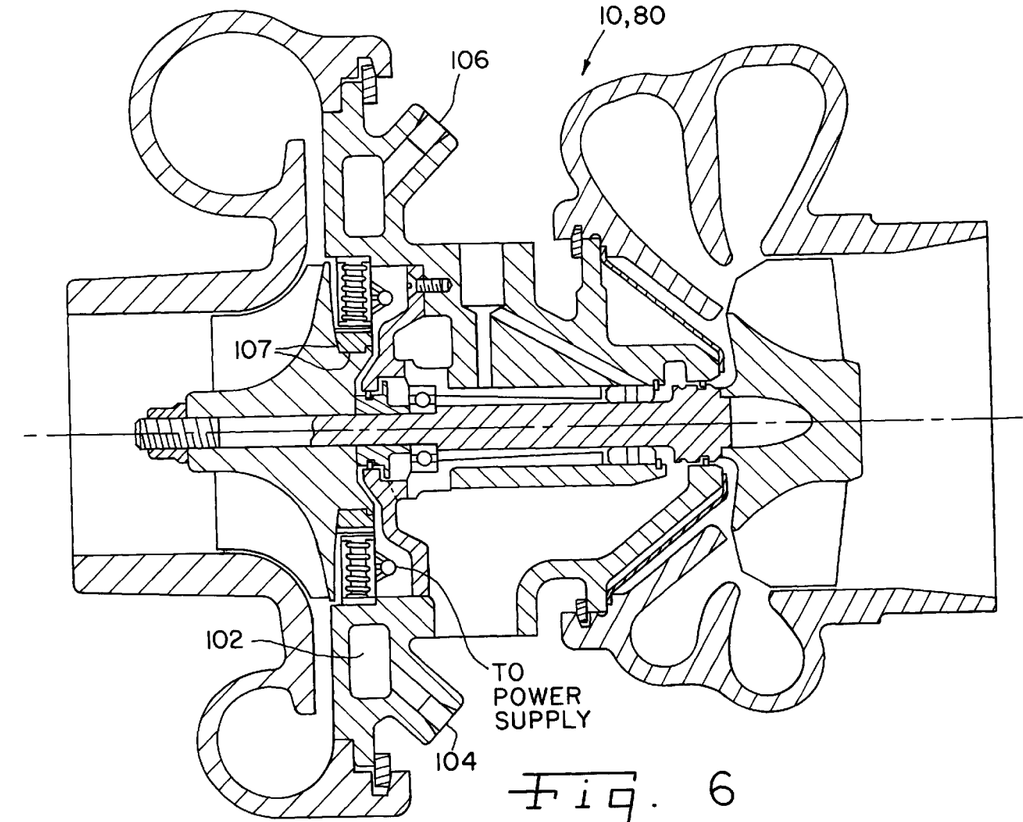
FIG. 6 is yet another embodiment of the turbocharger apparatus taken at a plane through the longitudinal axis of the main shaft of the turbocharger, showing a water jacket integrally formed in the center housing thereof for receiving an engine coolant flow.

As previously described, the motor magnets of either turbocharger embodiment 10, 80 remain relatively cool by virtue of being attached to the rotating compressor wheel of the turbocharger and can be insulated therefrom. For example, FIG. 6 indicates a layer of insulation material 107 which is located between each of the plurality of magnets on the compressor hub to thermally insulate the magnets from heat transfer from the remainder of the rotating assembly. Such insulation material can be any thermal insulating material known in the art or may be provided by an air gap. The compressor wheel takes in air at ambient temperature and the temperature rise due to the compression process takes place well outboard from the location of the magnets on the back of the compression wheel. However, the windings may be cooled by including a water jacket integrated into the turbocharger center housing, as shown in FIG. 6. More particularly, cooling water from the engine cooling system enters the water jacket 102 at inlet 104, circulates through the water jacket 102, and exits at outlet 106. It will be evident to the skilled artisan that the cooling jacket extends to and through significant heat sink zones within the turbocharger housing, and that cooling fluid circulation may be independent of the cooling system for the internal combustion engine to which the turbocharger of the present invention is affixed.

Figure 7:
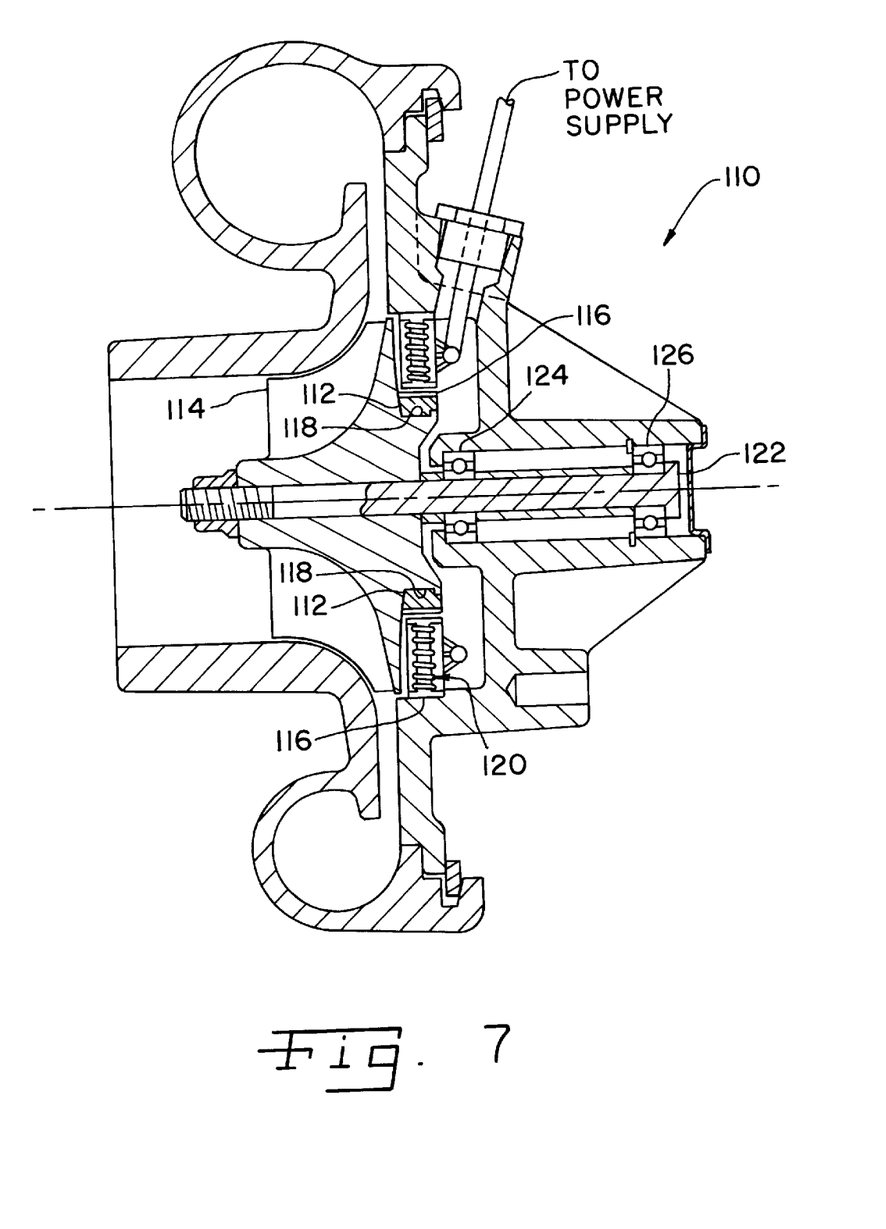
FIG. 7 is a motor-driven compressor of the invention utilizing the compact compressor magnet and stator structure to be used as a supercharging device for an internal combustion engine.

FIG. 7 illustrates another embodiment 110 of the invention in which motor and compressor elements are combined in an integrated structure providing a compact motor-driven compressor. In the same manner as in FIG. 1, each of a plurality of magnets 112 is circumferentially arrayed about the back face of a compressor wheel 114, and is retained thereto by a radially outer steel outer ring 116 and radially inner shoulder 118 formed in the back face of the compressor wheel 114 in the manner previously described. Stator windings 120 are positioned radially outwardly of the compressor magnets 112. The rotating assembly consists of a short axial shaft 122 which is supported at opposite ends thereof by a pair of grease-lubricated ball bearings 124, 126. By virtue of having the magnets attached to and driving with the compressor wheel 114, the resulting overall dimensions of such a compressor are smaller than compressor assemblies where the motor elements are mounted longitudinally on a shaft and located between supporting ball bearings.

Although certain preferred embodiments of the invention have been described herein, it will be apparent to those skilled in the art to which the invention pertains that variations and modifications of the described embodiments may be made without departing from the spirit and scope of the invention. Accordingly, it is intended that the invention be limited only to the extent required by the appended claims and applicable rules of law.

We claim:

1. A turbocharging device for use with an internal combustion engine, comprising:

a turbocharger housing;

a rotatable shaft supported by said housing carrying a combustion air compressor wheel and an exhaust gas turbine wheel;

an exhaust gas intake adjacent said exhaust gas turbine wheel to direct exhaust gas flow to said turbine wheel;

a combustion air intake adjacent to said combustion air compressor wheel to direct ambient air to said compressor wheel said compressor wheel having a plurality of air vanes on its front face and an axial extension on its rear face, said axial extension being radially spaced from said rotatable shaft; and a brushless assisting electric motor comprising a plurality of magnets carried by the axial extension of said compressor wheel, and a plurality of stator windings carried by said housing circumferentially and radially outwardly spaced from said plurality of magnets wherein energization of said plurality of stator windings drives said plurality of magnets for rotation of said rotatable shaft.

2. The turbocharging device of claim 1 further comprising a source of electrical energy wherein said plurality of windings is energized by said source of electrical energy to assist in driving the combustion air compressor wheel.

3. The turbocharging device of claim 1 wherein said permanent magnets are secured to said axial extension of said compressor wheel by a retention sleeve.

4. The turbocharging device of claim 1, wherein said permanent magnets are provided with means for providing thermal insulation against heat flow from the compressor wheel.

5. The turbocharging device of claim 1, wherein the compressor wheel includes a rear face having a plurality of pockets for supporting said permanent magnets.

6. The turbocharging device of claim 1, further including at least one Hall effect sensor adjacent to a selected stator winding, and control means responsive to said sensor for detecting the rotational position and speed of the permanent magnets, and for indicating to said control means when each one of said windings is to be energized.

7. The turbocharging device of claim 1 wherein said axial extension comprises an annular ledge, and said permanent magnets are located circumferentially around said compressor wheel on said annular ledge.

8. The turbocharging device of claim 1, wherein the housing forms a water jacket adjacent said plurality of windings.

9. The turbocharger improvement of claim 1 wherein said plurality of magnets are retained in a circumferential spacing on the back of the compressor wheel by a surrounding retention sleeve.

10. In a turbocharger for an internal combustion engine including an exhaust driven turbine and compressor wheel on a rotatable shaft, the improvement comprising:

a plurality of permanent magnets attached to the compressor wheel, said compressor wheel having a plurality of air compressing vanes on its front face and an axially extending annular ledge, radially spaced from said rotatable shaft on its rear face, said permanent magnets being located circumferentially around and attached to said compressor wheel on said annular ledge, and a plurality of adjacent stator windings located radially outwardly of said permanent magnets and in a plane in which the permanent magnets rotate, said plurality of stator windings being energizable to rotate and produce a flow of compressed air from said compressor wheel.

11. The improvement of claim 10 further comprising means for providing insulation against heat flow between the compressor wheel and the plurality of magnets.

12. The improvement of claim 10 wherein said plurality of stator windings may be connected to generate an electric current output to brake said compressor wheel and limit its rotation speed.

13. The turbocharger improvement of claim 10 further comprising a compressor wheel housing carrying said plurality of stator windings with a water jacket adjacent the plurality of windings.

* * * * *